(12) United States Patent
Roley (10) Patent No.: US 7,937,858 B2
(45) Date of Patent: May 10, 2011

(54) HITCH ASSEMBLY AND TRACTOR SCRAPER USING SAME

(75) Inventor: Robert Doyle Roley, Windsor, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 12/313,583

(22) Filed: Nov. 21, 2008

(65) Prior Publication Data
US 2010/0126048 A1    May 27, 2010

(51) Int. Cl.
*E02F 3/64* (2006.01)
*B60D 1/60* (2006.01)

(52) U.S. Cl. .......................................... 37/412; 280/507

(58) Field of Classification Search .................. 172/272, 172/439; 37/412; 280/477, 443, 481, 507, 280/511, 487, 489
See application file for complete search history.

(56) References Cited

U.S. PATENT DOCUMENTS

| | | | |
|---|---|---|---|
| 2,664,300 A | 12/1953 | Danielson et al. | |
| 2,783,039 A | 2/1957 | Wilson | |
| 3,243,203 A | 3/1966 | Hermiz et al. | |
| 3,434,738 A | 3/1969 | Campbell et al. | |
| 3,469,861 A | 9/1969 | Schexnayder | |
| 3,606,388 A | 9/1971 | Campbell | |
| 3,740,080 A | 6/1973 | Kuhl | |
| 3,906,613 A | 9/1975 | Chappell et al. | |
| 4,018,452 A | 4/1977 | Wagatsuma et al. | |
| 4,088,341 A | 5/1978 | Hawk | |
| 4,166,633 A | 9/1979 | Joyce, Jr. | |
| 4,266,798 A * | 5/1981 | Smith | 280/481 |
| 4,350,363 A * | 9/1982 | Waddell et al. | 280/481 |
| 4,382,609 A | 5/1983 | Hemmings | |
| 4,428,596 A * | 1/1984 | Bell et al. | 280/507 |
| 6,199,891 B1 * | 3/2001 | Bell et al. | 280/507 |
| 6,312,004 B1 * | 11/2001 | Kiss | 280/507 |

* cited by examiner

*Primary Examiner* — Robert E Pezzuto
(74) *Attorney, Agent, or Firm* — Liell & McNeil (57) ABSTRACT

A hitch assembly includes a hitch assembly frame. A tow bar includes a shaft having a first end pivotably attached to the hitch assembly frame and a coupling member attached to a second end of the shaft. A push plate is pivotably attached to the hitch assembly frame and defines a vertically aligned slot. The tow bar is movable within the vertically aligned slot. Such a hitch assembly may be used to operate machines, such as tractor scrapers, in a push-pull configuration.

19 Claims, 6 Drawing Sheets

HITCH ASSEMBLY AND TRACTOR SCRAPER USING SAME

TECHNICAL FIELD

The present disclosure relates generally to a hitch assembly, and more particularly to a hitch assembly including a tow bar and a push plate. Such a hitch assembly may be used to operate machines, such as tractor scrapers, in a push-pull configuration.

BACKGROUND

Earthmoving equipment is used to perform a variety of operations, including loading, or capturing, material, such as soil, at one location and dumping, or depositing, the material at another location. For example, such material movement may be employed to adjust elevations at a project site. Scrapers, which typically provide quick load, dump, and maneuver time, may be used to perform such operations, and generally include a machine having a bowl within which material may be captured, and a cutting edge located adjacent a cut opening of the bowl. Although various scraper configurations are available, scrapers are often pulled by a tractor, such as a wheeled or track type tractor. In addition, scrapers may provide their own traction via a separate engine that applies rim pull, or power, to the wheels of the scraper. In either arrangement, scrapers may also be pushed and/or pulled by a separate machine, or tractor, to provide additional power for scraper operations.

For example, during a typical push-pull operation, a first scraper may move into a loading area and take a shallow cut as a second scraper moves in behind to push the first scraper as it loads. When approaching the first scraper, the second scraper may align a push plate, positioned at the front of the second scraper, with a push block, positioned at the back of the first scraper. Once the first scraper is loaded, it may serve as a tow unit for the second scraper. Specifically, a movable bail, or tow bar, also positioned at the front of the second scraper, may engage a corresponding hook positioned at the back of the first scraper, effectively connecting or coupling the two scrapers together. Once the second scraper is loaded, the two scrapers may disconnect and travel to a fill location, or other suitable unloading site. Such a push-pull operation, as should be appreciated, may allow scrapers to load more quickly, thus improving production and lowering costs.

Typically, the push-pull coupling, or hitch assembly, provided at the front of the second scraper, as described above, includes a bail, or tow bar, and a push plate. For example, as shown in U.S. Pat. No. 4,088,341, the front of a scraper may include a push plate, which is pivotably connected to a frame. A U-shaped bail, or drawbar, includes two free ends that are pivotably attached to the frame at either side of the push plate. As further taught in the cited reference, the U-shaped bail and push plate may utilize a common shock absorber to cushion impact during both push and pull operations. Although this push-pull coupling may facilitate typical push-pull operations, it should be appreciated that there is a continuing need for push-pull couplings, or hitch assemblies, including tow bars and push plates, which facilitate improved push-pull operations, while reducing damage that may occur to the tow bar, push plate, or machine.

The present disclosure is directed to one or more of the problems set forth above.

SUMMARY OF THE DISCLOSURE

In one aspect, a hitch assembly includes a hitch assembly frame. A tow bar includes a shaft having a first end pivotably attached to the hitch assembly frame and a coupling member attached to a second end of the shaft. A push plate is pivotably attached to the hitch assembly frame and defines a vertically aligned slot. The tow bar is movable within the vertically aligned slot.

In another aspect, a tractor scraper includes a frame. A scraper bowl is supported on the frame and has a scraper blade disposed at a front portion of the scraper bowl. A tow bar includes a shaft having a first end attached to the frame and a coupling member attached to a second end of the shaft. A push plate is pivotably attached to the frame.

In yet another aspect, a hitch assembly includes a tow bar having a shaft and a coupling member. A portion of the coupling member is configured to telescopically receive the shaft. An actuator is configured to move the tow bar between a stowed configuration and a deployed configuration. The coupling member is restricted from rotation about the shaft in a first axial position along the shaft and is rotatable about the shaft in a second axial position along the shaft.

DETAILED DESCRIPTION

Figure 1:
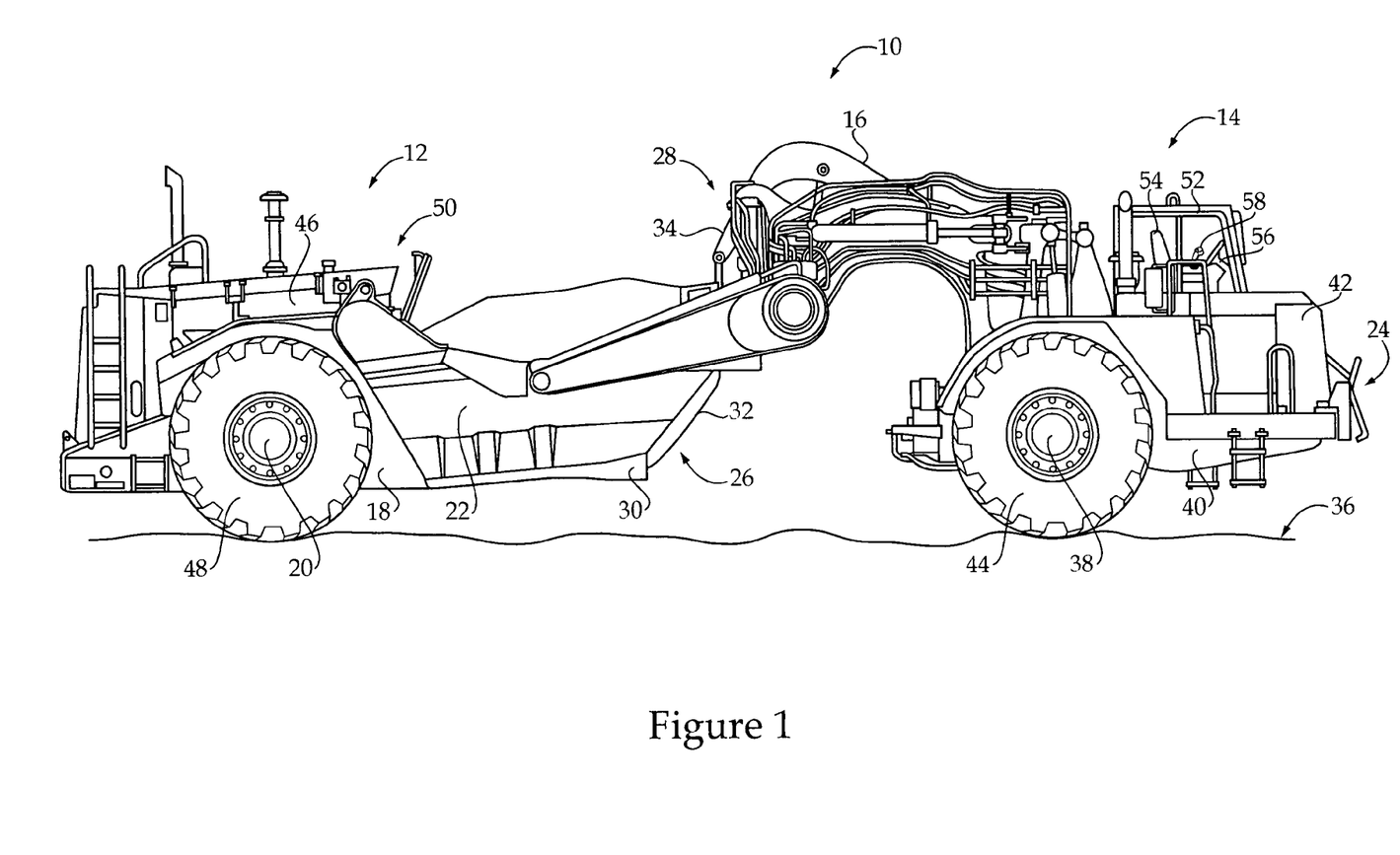
FIG. 1 is a side diagrammatic view of a machine, according to the present disclosure.

An exemplary embodiment of a machine 10 is shown generally in FIG. 1. The machine 10, as shown, includes a scraper 12 attached to a tractor 14 through an articulated hitch 16. Although the tractor 14 is depicted as a wheeled tractor, it should be appreciated that scraper 12 may be attached and, thus, pulled or towed by any machine or vehicle, including wheeled or track type tractors. The scraper 12, which may generally include a frame 18 having an axle assembly 20 about which a scraper bowl 22 may pivot, may also be operated in a variety of configurations, including, for example, a push-pull configuration, as is well known in the art. Such a push-pull configuration may be facilitated through the use of a hitch assembly 24, discussed below in greater detail.

Scraper bowl 22 may define a cut opening 26, at a front portion 28 of the scraper bowl 22, with a cutting edge, such as a scraper blade 30, positioned adjacent the cut opening 26. During an exemplary operation, an apron 32 may be pivoted upward, to a raised position, to open, or unblock, the cut opening 26, and also to increase the capacity of the scraper bowl 22. The scraper bowl 22 may be pivoted downward about the axle assembly 20, such as by using one or more scraper bowl actuators or cylinders 34, to engage the scraper blade 30 with material 36, such as, for example, soil. Such material 36 may be collected within the scraper bowl 22 as the tractor 14 and scraper 12 are maneuvered over the material 36. When the scraper bowl 22 is loaded to some desired capacity, the scraper blade 30 may be pivoted upward so that the cutting edge is out of contact with the material 36, and the machine 10 may be transported to a location where the material 36 is to be deposited. In addition, the apron 32 may be pivoted downward, to a lowered position, to close, or block, the cut opening 26 to prevent loss of the material 36 during transport. Although a simplified embodiment is described, it should be appreciated that scraper 12 may include additional components or features, such as, for example, an auger attachment, elevator mechanism, or ejector.

The tractor 14 may provide the sole means for propulsion and, in such arrangements, the tractor 14 and scraper 12 may include a single drive axle, such as, for example, a drive axle of a front axle assembly 38. The front axle assembly 38 may be coupled with a frame 40, or front frame, of the tractor 14, which may support a front engine compartment 42. An engine, such as an internal combustion engine, or other power source may be housed within the front engine compartment 42 and may provide power to front wheels 44 of the front axle assembly 38. According to some embodiments, the scraper 12 may also include propulsion means, such as an internal combustion engine or other power source disposed within a rear engine compartment 46, for driving rear wheels 48 of axle assembly 20, also referenced herein as a rear axle assembly. The rear axle assembly 20, disposed at a rear portion, or back, 50 of the scraper bowl 22, may thus, according to such tandem powered arrangements, provide its own power, or traction.

Either or both of the engines, such as internal combustion engines, of the front engine compartment 42 and the rear engine compartment 46 may provide power to a hydraulic system of the scraper 12. Specifically, an internal combustion engine of the machine 10 may power a hydraulic pump, which may provide a flow of hydraulic fluid to control one or more hydraulic devices of the machine 10. For example, such a hydraulic pump may supply a flow of high-pressure hydraulic fluid to one or more hydraulic actuators, such as scraper bowl cylinders 34, to control movement of the scraper bowl 22. Hydraulic systems are known and are only peripherally within the scope of the present disclosure. Therefore, such hydraulic control will not be discussed herein in greater detail.

An operator control station 52 may be supported on the front frame 40, and may include known devices, such as, for example, a seat assembly 54 and a steering device 56 that facilitate operator control of the tractor 14 and/or scraper 12. The operator control station 52 may include various other devices, including, but not limited to, one or more machine operation controllers 58. For example, one or more machine operation controllers 58 may be provided for selecting or controlling an engine speed of an internal combustion engine provided within either or both of engine compartments 42 and 46. Further, one or more machine operation controllers 58 may be provided for controlling operation of the scraper 12, such as by controlling movement of the scraper bowl actuators or cylinders 34, or hitch assembly 24. Additional controls and devices, as should be appreciated, may also be provided within the operator control station 52 for controlling various operational aspects of the tractor 14 and/or scraper 12. Such control, as referenced herein, may include either of mechanical or electronic control means, or a combination thereof.

Figure 2:
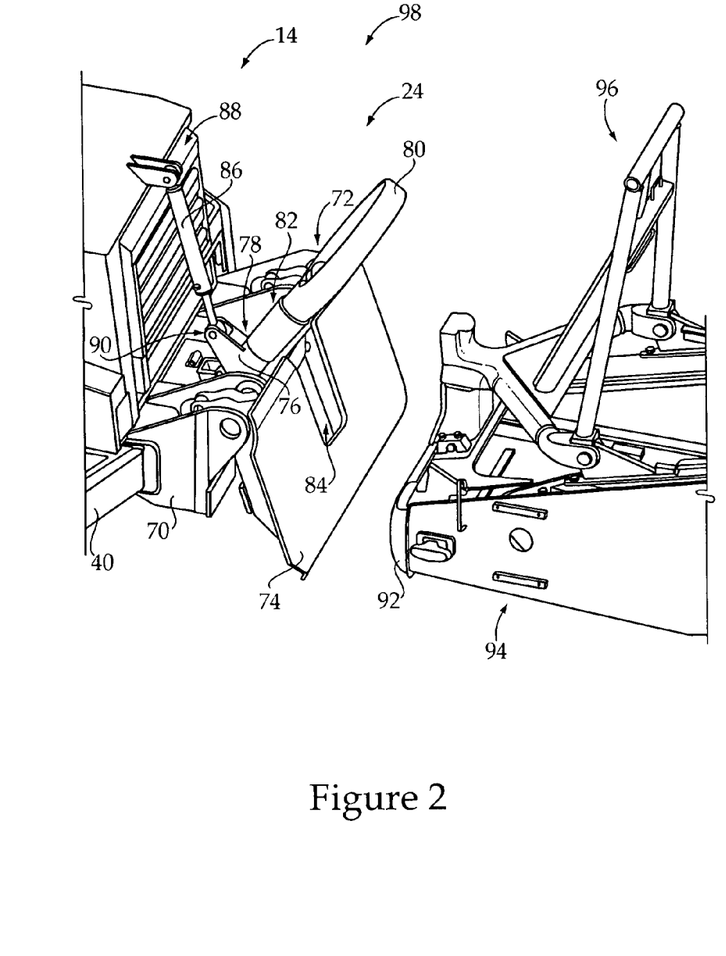
FIG. 2 is a perspective view of one embodiment of a hitch assembly of the machine of FIG. 1, a tow bar of the hitch assembly being shown in a push configuration, according to the present disclosure.

Turning now to FIG. 2, the hitch assembly 24, which may be supported by the front frame 40 of tractor 14 of FIG. 1, is shown in greater detail. According to one embodiment, the hitch assembly 24 may include a hitch assembly frame 70 for supporting a tow bar 72 and a push plate 74. The tow bar 72 may include a shaft 76 having a first end 78 pivotably attached to the hitch assembly frame 70, such as through a ball and socket joint, and a coupling member 80, such as a loop, attached to, or coupled with, a second end 82 of the shaft 76. The push plate 74 may be pivotably attached to the hitch assembly frame 70, such as through a mechanical linkage described below, and may define a vertically aligned slot 84. An actuator 86, such as a hydraulic cylinder, may have a first end 88 attached to the hitch assembly frame 70 and a second end 90 attached to the shaft 76 of the tow bar 72. The actuator 86 may be configured to move the tow bar 72 between a push configuration, as shown, and a pull configuration, discussed below with reference to FIG. 3.

In the push configuration, or stowed configuration, the tow bar 72 of the hitch assembly 24 may be raised, such as by retracting the actuator 88, so that the push plate 74 may engage a push block 92 of a rear portion, or back, 94 of a first scraper 96. For example, according to a typical push operation, the first scraper 96 may begin loading as the tractor 14, also referenced herein as a second scraper 98, moves in behind to push the first scraper 96 as it loads. More specifically, when approaching the first scraper 96, the second scraper 98, with the tow bar 72 in the push configuration described above, may align the push plate 74 with the push block 92 of the first scraper 96 and push the first scraper 96 as it loads. Once the first scraper 96 is loaded, it may serve as a tow, or pull, unit for the second scraper 98.

Figure 3:
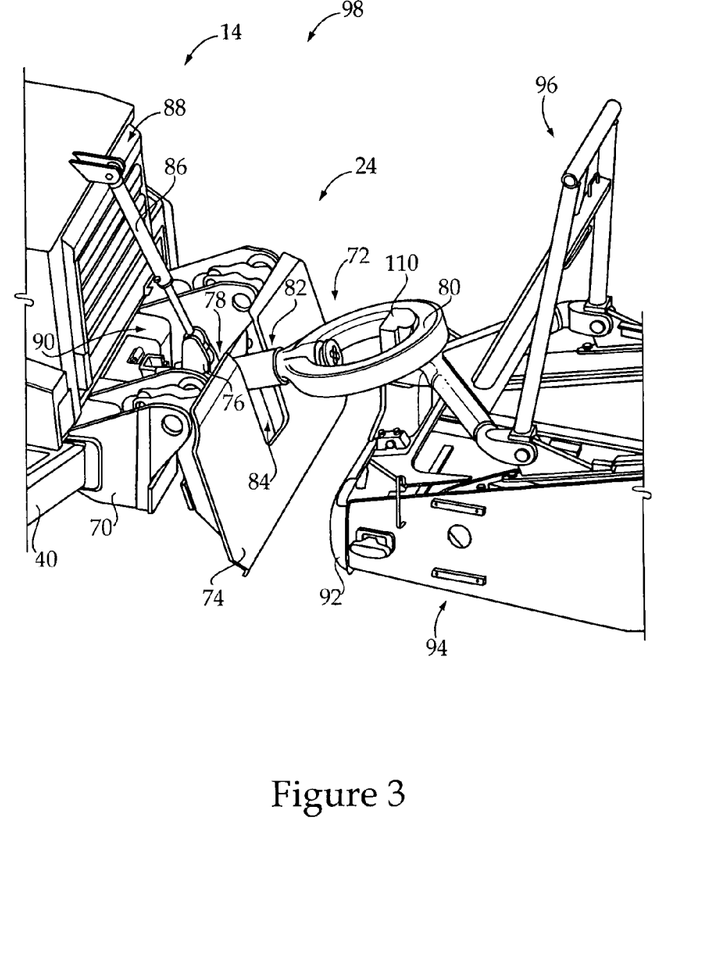
FIG. 3 is a perspective view of the hitch assembly of FIG. 2, the tow bar of the hitch assembly being shown in a pull configuration, according to the present disclosure.

Specifically, as shown in FIG. 3, the tow bar 72 may be lowered into the pull configuration, by extending the actuator 88, such that the coupling member 80, shown as a loop, of the tow bar 72 engages a corresponding hook 110 at the back 94 of the first scraper 96. As shown, the tow bar 72 may be received within the vertically aligned slot 84 of the push plate 74 as it is lowered. In this pull configuration, or deployed configuration, the two scrapers 96 and 98 are effectively connected, or coupled together, allowing the first scraper 96, which may already be loaded, to pull the second scraper 98 as the second scraper 98 loads. Once the second scraper 98 is loaded, the two scrapers 96 and 98 may disconnect, such as by moving the tow bar 72 back into the push configuration, thus disengaging the loop 80 of the second scraper 98 from the hook 110 of the first scraper 96.

Figure 4:
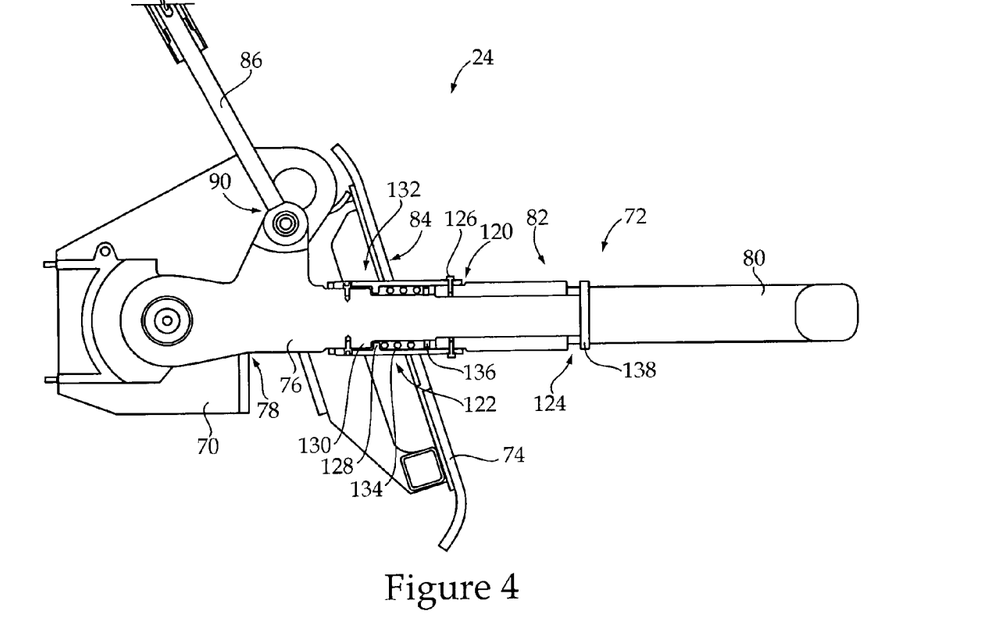
FIG. 4 is a side diagrammatic view, in cross section, of the tow bar of FIGS. 2 and 3, a cylinder and loop of the tow bar being shown in a first axial position along a shaft, according to the present disclosure.

Turning now to FIG. 4, the tow bar 72 will be described in greater detail. Specifically, the tow bar 72 may include a cylinder 120 having a first end 122 that telescopically receives the second end 82 of the shaft 76, and a second end 124 that terminates, or includes, the coupling member 80, described above. Although the cylinder 120 is depicted as two components having a bolted connection 126, it should be appreciated that the cylinder 120 may include one integral component, or any number of components, such that the cylinder 120 and coupling member 80 are movable together. Such configuration choices, as should be appreciated, may be based on a number of factors, including, for example, ease of manufacturing and/or assembly. The cylinder 120 and coupling member 80 may be movable along the shaft 76 between a first axial position, as shown, and a second axial position, discussed with reference to FIG. 6. It should be appreciated that the coupling member 80, also referenced herein as a loop, may include any shape and/or cross-section useful for coupling the tow bar 72 with an attachment feature of another machine, such as the hook 110 of FIGS. 2 and 3.

Still referring to FIG. 4, the first end 122 of the cylinder 120 may include an inwardly extending projection 128 that engages a first external flange 130 of the shaft 76. The first external flange 130, which may be circumferentially continuous or discontinuous, may be positioned at a central portion 132 of the shaft 76. A spring 134, such as a compression spring, may be positioned around the shaft 76 between the inwardly extending projection 128 of the cylinder 120 and a spring retaining member 136, such as a washer having an interference fit within a groove of the shaft 76. The spring retaining member 136 may be positioned between the first external flange 130 and a second external flange 138, discussed below. The spring 134 may be provided with sufficient spring force to urge the inwardly extending projection 128 of the cylinder 120 toward, or into engagement with, the first external flange 130 of the shaft 76. Such spring force, as should be appreciated, may bias the cylinder 120 and loop 80 of the tow bar 72 toward the first axial position along the shaft 76.

Figure 5:
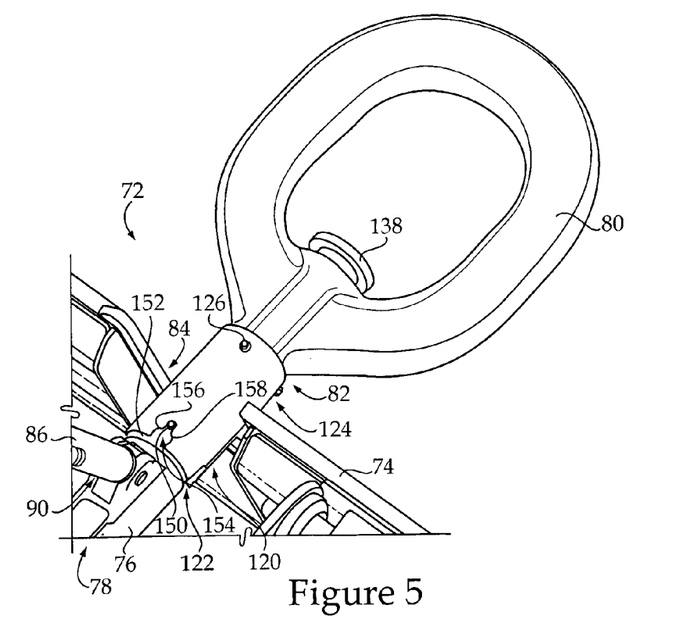
FIG. 5 is a perspective view of a portion of the tow bar, the cylinder and loop shown in the first axial position of FIG. 4, according to the present disclosure.

In this biased position, as shown in FIG. 5, the cylinder 120 and loop 80 may be restricted from rotation about the shaft 76. For example, at least one alignment pin 150 may extend from an external surface 152 of the shaft 76. The one or more alignment pins, such as alignment pin 150, may be positioned within corresponding grooves, such as a groove 154, of the cylinder 120. Such alignment pins and grooves may be positioned such that, when the cylinder 120 and loop 80 are positioned in the first axial position along the shaft 76, first and second sides 156 and 158 of the groove 154 engage the alignment pin 150, thus preventing rotation of the cylinder 120 and loop 80 relative to the shaft 76. For example, it may be desirable to prevent rotation of the loop 80 when the tow bar 72 is in the push configuration and/or when the loop 80 is being moved into engagement with the hook 110 to couple the first and second scrapers 96 and 98.

Figure 6:
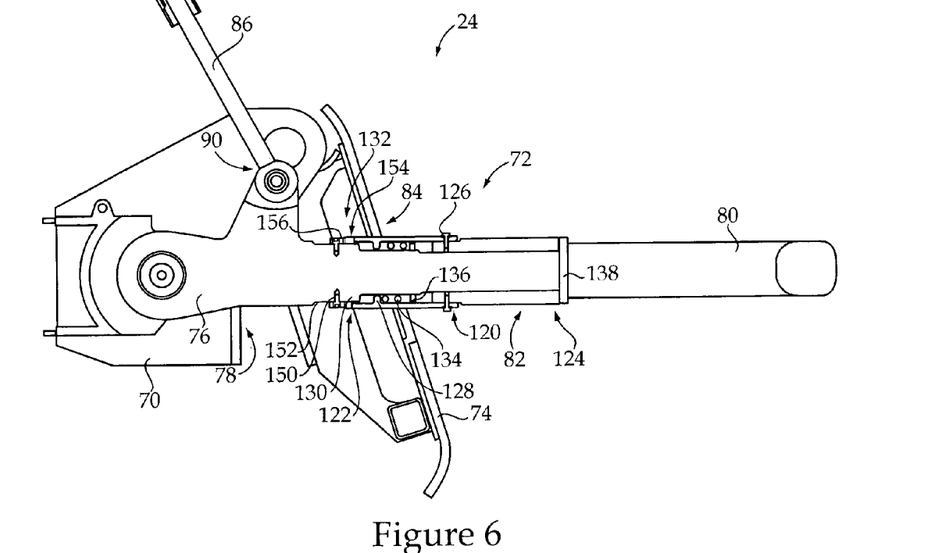
FIG. 6 is a side diagrammatic view, in cross section, of the tow bar of FIGS. 2 and 3, the cylinder and loop of the tow bar being shown in a second axial position along the shaft, according to the present disclosure.
Figure 7:
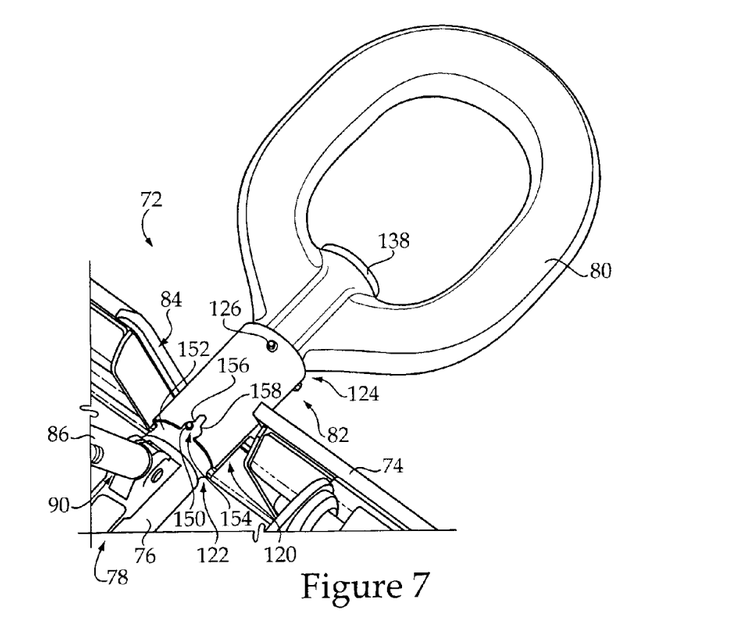
FIG. 7 is a perspective view of a portion of the tow bar, the cylinder and loop shown in the second axial position of FIG. 6, according to the present disclosure.

Turning now to FIG. 6, the cylinder 120 and loop 80 are shown in the second axial position along the shaft 76. According to the exemplary embodiment, when the first scraper 96 pulls the second scraper 98, with the loop 80 and hook 110 engaged, the loop 80 and cylinder 120 may be pulled against the bias of spring 134. Depending on the spring force provided by spring 134, the cylinder 120 and loop 80 may be pulled toward the second end 82 of the shaft 76 such that the second end 124 of the cylinder 120 moves toward, or engages, the second external flange 138 of the shaft 76. Such spring force, as should be appreciated, may also provide damping damping of forces transmitted between the first and second scrapers 96 and 98 as the second scraper 98 is pulled. In addition, in this second axial position, the cylinder 120 and loop 80 may be rotatable about the shaft 76. Specifically, as shown in FIG. 7, the first and second sides 156 and 158 of the groove 154 may be spaced apart from the alignment pin 150, in the second axial position of the cylinder 120 and loop 80, thus allowing rotation. It should be appreciated that the rotation permitted by groove 154 may increase as the cylinder 120 and loop 80 move from the first axial position along the shaft 76 toward the second axial position. According to the exemplary embodiment, it may be desirable to allow rotation of the loop 80 when the first scraper 96 turns while the first scraper 96 and second scraper 98 are coupled together.

Although a specific embodiment is shown for restricting and/or allowing rotation of the loop 80, it should be appreciated that a variety of alternative embodiments are contemplated. For example, some designs may not require the telescoping movement of the shaft 76 relative to a portion of the loop 80. Further, some embodiments may not require a locking feature, such as the locking feature provided by the alignment pin 150 and groove 154. Rather, according to some embodiments, it may be desirable to allow a greater rotation of the loop 80 than that which is permitted by the exemplary embodiment. Regardless of the selected design, however, it may be preferable to bias the loop 80 to a position in which rotation is restricted, thus preventing rotation of the loop 80 while the tow bar 72 is stowed or is in the process of being deployed. Otherwise, it may be desirable to allow a selected amount of rotation.

Figure 8:
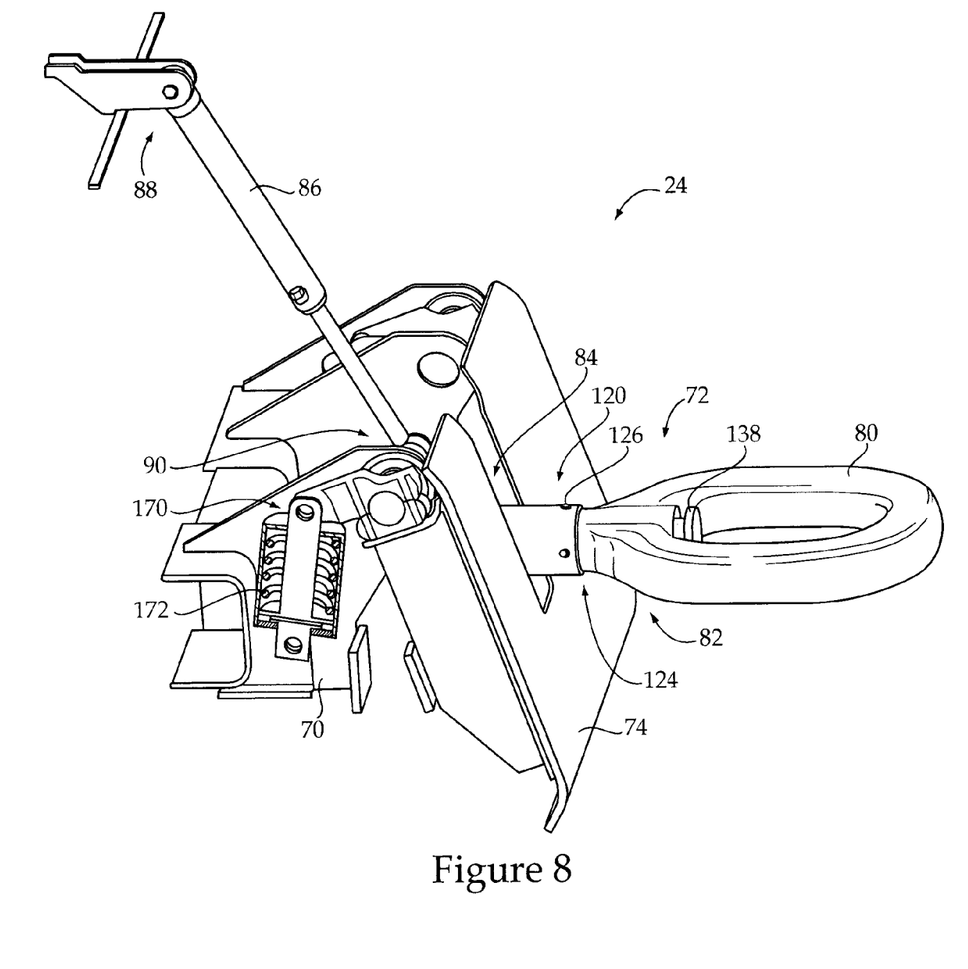
FIG. 8 is a perspective view, in cross section, of the push plate of FIGS. 2 and 3, the push plate being shown in a first position, according to the present disclosure.
Figure 9:
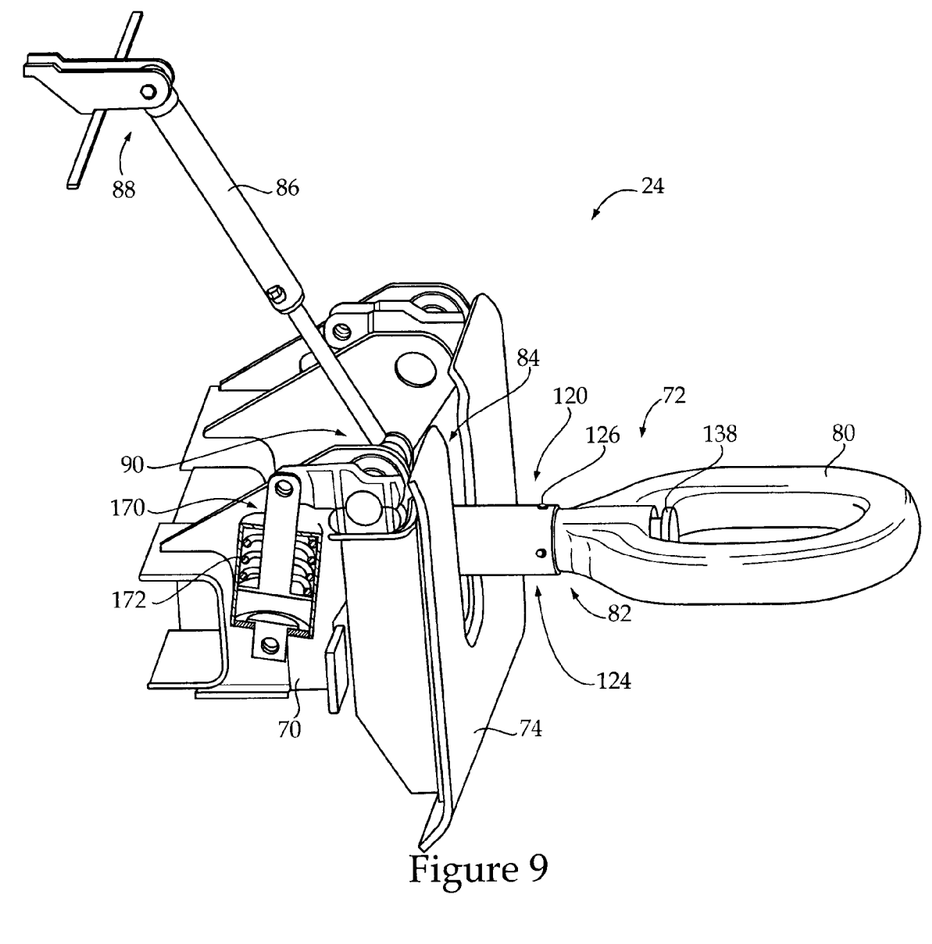
FIG. 9 is a perspective view, in cross section, of the push plate of FIGS. 2 and 3, the push plate being shown in a second position, according to the present disclosure.

Turning now to FIGS. 8 and 9, the push plate 74 is shown in greater detail. Specifically, the push plate 74 may be pivotably attached to the hitch assembly frame 70 through one or more mechanical linkages, such as a mechanical linkage 170. The mechanical linkage 170, as shown, may include one or more springs, such as spring 172. Spring 172, as should be appreciated, may provide damping of movement of the push plate 74 between a first, or spring biased, position, shown in FIG. 8, and a second, or actuated, position, as shown in FIG. 9. According to the exemplary embodiment, the push plate 74 may be actuated during a push operation when the push plate 74 of the second scraper 98 engages the push block 92 of the first scraper 96. As such, when the push plate 74 is actuated, the spring 172 may be compressed to increase the spring force within the mechanical linkage 170.

It should be appreciated that the hitch assembly 24 may be provided as an attachment for tractor 14, or any other machine, to facilitate push-pull operations. As such, the hitch assembly 24 may be manufactured as a subassembly, including a frame, such as hitch assembly frame 70, and one or both of the tow bar 72 and push plate 74. According to one embodiment, the hitch assembly 24 may include only the tow bar 72, for performing pull operations, or only the push plate 74, for performing push operations. The tow bar 72 may also be provided as an assembly, including the actuator 86. Alternatively, however, one or both of the tow bar 72 and push plate 74 may be provided on tractor 14 during manufacture. Additional features and/or enhancements are also contemplated for use with the hitch assembly 24.

INDUSTRIAL APPLICABILITY

The present disclosure finds potential application in any machine that operates in a push-pull configuration. Further, the disclosure may be applicable to machines, such as tractor scrapers, which utilize a bowl, such as a scraper bowl, for removing, or loading, material, such as soil. Yet further, the present disclosure may be applicable to tractor scrapers operating in push-pull configurations that require increased efficiency and/or reduced wear or damage to the scraper and a hitch assembly used for coupling scrapers. Such machines may include, but are not limited to, single engine scrapers, tandem powered scrapers, and other machines known in the art that may operate in a push-pull configuration.

Referring generally to FIGS. 1-9, a machine 10, such as a scraper 12, may be pulled by a tractor 14 and may generally include a frame 18 and a rear axle assembly 20, about which a scraper bowl 22 may pivot. The scraper bowl 22 may define a cut opening 24, at a front portion 26 of the scraper bowl 22, with a cutting edge, such as a scraper blade 28, positioned adjacent the cut opening 24. The tractor 14 may also include a hitch assembly 24 for facilitating push-pull operations. During a typical push-pull operation, a first scraper 96 may move into a loading area and take a shallow cut, by pivoting the blade 28 into engagement with material 36, as a second scraper 98, which may include tractor 14, moves in behind to push the first scraper 96 as it loads. More specifically, when approaching the first scraper 96, the second scraper 98, with a tow bar 72 of the hitch assembly 24 in the push configuration described above, may align a push plate 74 of the hitch assembly 24 with a push block 92 of the first scraper 96 and push the first scraper 96 as it loads.

Once the first scraper 96 is loaded, it may serve as a tow, or pull, unit for the second scraper 98. Specifically, the tow bar 72 may be lowered into the pull configuration, by extending the actuator 88, such that the loop 80 of the tow bar 72 engages a corresponding hook 110 at the back 94 of the first scraper 96. As shown, the tow bar 72 may be received within a vertically aligned slot 84 of the push plate 74 as it is lowered. In this pull configuration, the two scrapers 96 and 98 are effectively connected, or coupled together, allowing the first scraper 96, which may already be loaded, to pull the second scraper 98 as the second scraper 98 loads. Once the second scraper 98 is loaded, the two scrapers 96 and 98 may disconnect, such as by moving the tow bar 72 back into the push configuration, thus disengaging the loop 80 of the second scraper 98 from the hook 110 of the first scraper 96.

Utilizing the hitch assembly 24 described herein may facilitate coupling of the first scraper 96 and second scraper 98, such as to perform a push-pull operation, while reducing damage that may occur to the tow bar 72, push plate 74, or any portion of the scrapers 96 and 98, including tractor 14. Specifically, a coupling member 80, such as a loop, of the tow bar 72 may have a first position in which rotation of the loop 80 about an axis defined by shaft 76 is restricted, thus preventing rotation of the loop 80 during engagement of the loop 80 with the hook 10. However, rotation of the loop 80 may be permitted in a second position of the loop 80, such as when the first scraper 96 is pulling the second scraper 98. As such, when the first scraper 96 turns, the loop 80 may be rotated in the direction of the turn to reduce side loading of the tow bar 72 that may occur during such movements. In addition, the push plate 74, defining a vertically aligned slot 84 for movement of the tow bar 72 between push and pull configurations, may include a greater surface area, as compared to conventional designs, thus reducing damage that may occur to the towed scraper, or second scraper 98, if the first and second scrapers 96 and 98 are not properly aligned, during a push operation.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hitch assembly for facilitating push-pull operations, comprising:
   a hitch assembly frame configured to attach to a front frame of a machine;
   a tow bar including a shaft having a first end pivotably attached to the hitch assembly frame and a coupling member attached to a second end of the shaft; and
   a push plate pivotably attached to the hitch assembly frame and including a vertically aligned slot, the tow bar being movable within the vertically aligned slot, wherein the push plate is configured to engage a push block of a rear portion of another machine.

2. The hitch assembly of claim 1, wherein the coupling member includes a loop, the loop being restricted from rotation about an axis defined by the shaft in a first position and being rotatable about the axis in a second position, the loop being biased to the first position.

3. The hitch assembly of claim 2, wherein the tow bar further includes a cylinder having a first end telescopically receiving the second end of the shaft and a second end terminating in the loop.

4. The hitch assembly of claim 3, wherein the cylinder and loop are movable between a first axial position along the shaft and a second axial position along the shaft, the cylinder and loop being biased to the first axial position.

5. The hitch assembly of claim 4, wherein an inwardly extending projection of the first end of the cylinder engages a first external flange positioned at a central portion of the shaft in the first axial position, and the second end of the cylinder engages a second external flange at the second end of the shaft in the second axial position.

6. The hitch assembly of claim 5, further including a spring positioned around the shaft between the inwardly extending projection of the cylinder and a spring retaining member positioned around the shaft, the spring retaining member being positioned between the first external flange and the second external flange.

7. The hitch assembly of claim 4, wherein the cylinder and loop are restricted from rotation about the shaft in the first axial position and are rotatable about the shaft in the second axial position.

8. The hitch assembly of claim 7, further including at least one alignment pin extending from an external surface of the shaft and positioned within a groove of the cylinder, wherein first and second sides of the groove engage the alignment pin in the first axial position and are spaced apart from the alignment pin in the second axial position.

9. The hitch assembly of claim 1, wherein the actuator includes a hydraulic cylinder having a first end attached to the hitch assembly frame and a second end attached to the shaft.

10. A tractor scraper, comprising:
    a frame;
    a scraper bowl supported on the frame and having a scraper blade disposed at a front portion thereof;
    a tow bar including a shaft having a first end attached to the frame and a coupling member attached to a second end of the shaft; and
    a push plate pivotably attached to the frame and including a vertically aligned slot for receiving the tow bar in a pull configuration of the tow bar.

11. The tractor scraper of claim 10, further including an actuator having a first end attached to the frame and a second end attached to the tow bar, the actuator configured to move the tow bar between a push configuration and the pull configuration.

12. The tractor scraper of claim 11, wherein the tow bar further includes a cylinder having a first end telescopically receiving the second end of the shaft and a second end terminating in a loop.

13. The tractor scraper of claim 12, wherein the cylinder and loop are movable between a first axial position along the shaft and a second axial position along the shaft, the cylinder and loop being biased to the first axial position.

14. The tractor scraper of claim 13, wherein an inwardly extending projection of the first end of the cylinder engages a first external flange positioned at a central portion of the shaft in the first axial position, and the second end of the cylinder engages a second external flange at the second end of the shaft in the second axial position.

15. The tractor scraper of claim 13, wherein the cylinder and loop are restricted from rotation about the shaft in the first axial position and are rotatable about the shaft in the second axial position.

16. The tractor scraper of claim 15, further including at least one alignment pin extending from an external surface of the shaft and positioned within a groove of the cylinder, wherein first and second sides of the groove engage the alignment pin in the first axial position and are spaced apart from the alignment pin in the second axial position.

17. A hitch assembly, comprising:
a tow bar including a shaft and a coupling member, a portion of the coupling member being configured to telescopically receive the shaft;
an actuator for moving the tow bar between a stowed configuration and a deployed configuration; and
wherein the coupling member is restricted from rotation about the shaft in a first axial position along the shaft and is rotatable about the shaft in a second axial position along the shaft.

18. The hitch assembly of claim 17, wherein the coupling member includes a cylinder having a first end telescopically receiving the shaft and a second end terminating in a loop, the cylinder being movable between a first external flange positioned at a central portion of the shaft and a second external flange positioned at an end of the shaft.

19. The hitch assembly of claim 18, further including at least one alignment pin extending from an external surface of the shaft and positioned within a groove of the cylinder, wherein first and second sides of the groove engage the alignment pin in the first axial position and are spaced apart from the alignment pin in the second axial position.

* * * * *